Oct. 30, 1962 B. D. LUMMIS 3,061,686

INTERCOM SYSTEM

Filed Nov. 16, 1959

3 Sheets-Sheet 1

INVENTOR
BRUCE D. LUMMIS
BY W. J. Shanley Jr.
ATTORNEY

Oct. 30, 1962 B. D. LUMMIS 3,061,686

INTERCOM SYSTEM

Filed Nov. 16, 1959 3 Sheets-Sheet 2

INVENTOR
BRUCE D. LUMMIS
BY W. J. Shanley Jr.
ATTORNEY

INVENTOR
BRUCE D. LUMMIS
BY W. J. Shanley Jr.
ATTORNEY

United States Patent Office 3,061,686

Patented Oct. 30, 1962

3,061,686

INTERCOM SYSTEM

Bruce D. Lummis, Webster, N.Y., assignor to General Dynamics Corporation, Rochester, N.Y., a corporation of Delaware Filed Nov. 16, 1959, Ser. No. 853,275
7 Claims. (Cl. 179—39)

This invention relates to communication systems and particularly to systems whereby an official or person in authority may instantly put himself into communication with any one of a number of subordinates, the system being not intended for general intercommunication between the said subordinates but for the use of an official in his activities in a position of authority.

The object of the invention is primarily simplicity and economy. In systems of this nature, commonly called intercom systems, it has been common practice to provide some means to assure privacy over a connection when desired by the official or the subordinate and to prevent intrusion on a busy connection. Generally speaking these arrangements were embodied in a relay at each station which would respond to such a condition when encountered and which would cut off the station so as to prevent such intrusion. In the present system only a single such relay is provided and that is placed at the master station. Intrusion on a private or a busy line is prevented, not by the operative response, but by its failure to operate when such a condition is encountered. As a consequence, the amount of apparatus required for the system is reduced and the number of conductors leading from the master station to each remote subordinate station is reduced. Economy in first cost and in maintenance and simplicity in operation is achieved.

Another object of the invention is to provide means to quiet the talking or speaker circuit and to prevent the transmission of circuit operation noises as the speaker circuit is placed in and taken out of operation.

The intercom system embodying the present invention consists of one or more master stations each equipped with an array of push buttons, one for each point to be reached, which may be a remote station or another master station. Each master station is equipped with an audible alarm which will sound whenever a call is made from one of the stations associated therewith and an individual visual indicator to identify the calling station.

When the person at a master station wishes to communicate with a given subordinate, he merely pushes the button associated with the line leading to such subordinate's station and then speaks. Both the master station and the remote station are equipped each with a bidirectional loudspeaker and these, being put into communication with each other through the operated push button, afford instant communication one with the other. When a subordinate wishes to communicate with the person at the master station he operates a call-in button which causes his call indicator at the master station to glow and, if the master station is not in use, to operate a chime to attract the attention of the official thereat, who thereupon completes the connection by pushing the appropriate push-button.

It is to be noted that each master station is equipped with a privacy and busy indicator which glows when a connection to another station is set up. Each of these conditions will afford a ground connection which will prevent the operation of the operate relay at the master station. The privacy bar may be overridden by the master even though he has had warning that he has reached a remote station in privacy, but the busy condition is a complete bar and such master may not intrude on a busy line.

An important feature of the present invention is the use of an "operate" relay normally operated for rendering the speaking circuit effective but barred from operation by encounter of a busy or privacy condition. Under normal conditions where a master station has established communication with a remote station and no privacy condition has been established, this operate relay will be automatically operated to establish a talking circuit but where a privacy condition has been established, then the master station operator must operate his talk-listen switch to override the effect of the privacy connection. In either case, the operation of this operate relay will establish a busy condition which will bar the operation of another master station operate relay and which cannot be overridden by such an intruding connection.

Where a remote station has operated its privacy button and a push-button connection with a master has been established, such master must operate his talk bar throughout any conversational period to establish a one-way conversation with the person at the remote station so as to cut off the privacy ground and allow the operation of his operate relay. However, to another master station attempting a connection to this same remote station another bar, here a busy ground, will appear and this cannot be dismissed by the second master.

A feature of the invention is a circuit extending in series through each and every one of the selector push-buttons of a master station and which circuit is closed regardless of the operated or released position of each of the said push-buttons but which is opened momentarily during the release or the operation of any one of said buttons. Such a circuit leads to the winding of the operate relay and is designed to allow a momentary release of the relay during the movement of release or the movement of the operation of any one of the said selector push-buttons to give a clear opportunity for the operation of the busy indicator, this indicator operating only when the operate relay is released. Thus, if a busy or a privacy condition is encountered, the operate relay will become shortcircuited and will refuse to reoperate upon the completion of this said series circuit whereas under marginal conditions it might fail to release if the busy or privacy condition were encountered while it was still fully operated.

A feature of the present invention is the use of a transistor amplifier arranged for insertion in the circuit between the speaker at the master station and the speaker at the remote station which becomes immediately effective when the circuit is completed. Normally the speaker circuit is muted, by being disconnected by the said operate relay from the output of the said amplifier, and generally such an amplifier has a tendency to oscillate when its output is opened. Therefore, a means is provided under control of the said operate relay to apply a negative potential of greater magniture than the normal negative bias of the collector of the first stage or driver of the amplifier to the emitter thereof to prevent the transmission of normal circuit noise. The emitter is provided with a capacitor which maintains this overriding negative potential to the emitter for an instant after this connection is broken by the operate relay so that the normal circuit noise resulting from the connection of the speaker to the amplifier output and the extension of the speaker circuit to the distant point will not be manifested as a click in the two speakers. Thus this feature may be stated to be the provision of means to slowly render the transistor amplifier effective upon its insertion in the speaker circuit where it is understood that by slowly is meant the discharge time of a condenser which nevertheless will appear to a listener to be an immediate enablement of the circuit.

A feature of the invention, then, is a means provided to maintain the amplifier in the talking circuit inoperative so far beyond the stage where it will become inoperative that the change from such inoperative state to said operative state when controlled by a transient, such as the discharge of a condenser, will afford time in the switching operations to complete such switching operations before the amplifier becomes fully operative and thus to avoid switching noises in the talking circuit.

When at a remote station the call-in button is depressed, a circuit is established through its indicator lamp, thence in series through contacts of all the master station keys to the call-in bus to operate the talk-listen relay. This relay operates and completes a circuit for a chime and remains operated until released by the operation of one of the station buttons (that with which the glowing indicator lamp is associated) whereupon the indicator lamp is supplied directly with battery until the conversation is ended and the button is released. When the station button is thus operated, the talk-listen relay is alternately operated when the talk-listen bar is depressed to talk and released when this bar is released. When the station button is operated, the operate relay is held operated but may be released by the transmission of ground from the remote station over the privacy conductor under control of the subscriber thereat.

A feature of the invention may therefore be stated as the provision of an audible signal means which will respond to produce a single audible signal upon its initial operation but will thereupon become disabled and remain disabled throughout the remainder of the use of an established connection.

Other features will appear hereinafter.

The drawings consist of three sheets having five figures, as follows.

Figure 1:
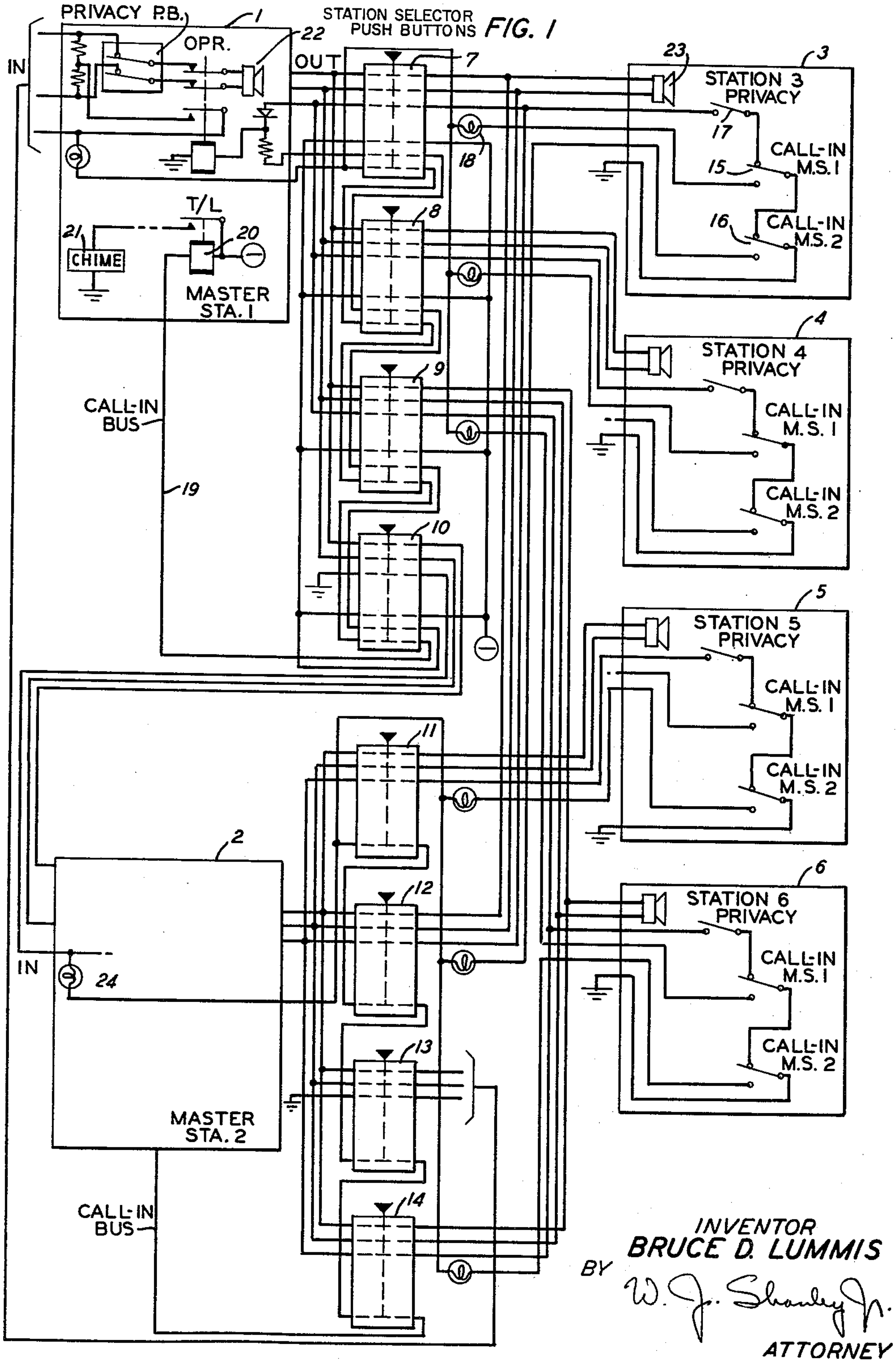
FIG. 1 is a schematic circuit diagram partly in block form to illustrate the general arrangement of the components of the present invention.

FIG. 1 is a schematic diagram for explaining the fundamental arrangement of the intercom system embodying the features of the present invention. Two master stations, 1 and 2, are indicated and four remote stations, 3, 4, 5 and 6, are likewise indicated. Master station number 1 has associated therewith four push-buttons, 7, 8, 9 and 10, by which the subscriber thereat may call in remote stations 3, 4 and 6 and master station 2 respectively. In like manner, master station 2 has associated therewith push-buttons 11, 12, 13 and 14 by which the subscriber thereat may call in remote stations 5 and 1, master station 1 and remote station 6. Each remote station is provided with one or more push-buttons by which a master station may be called in. Thus, if the subscriber at remote station 3 operates his push-botton 15, he may call in master station 1, or, alternatively, if he operates his push-button 6, he may call in master station 2. Likewise, remote stations 4 and 6 may call in master station 2. Likewise, remote stations 4 and 6 may call in master station 1 and remote stations 5 and 6 may call in master station 2.

Each remote station is provided with a privacy button, such as privacy button 17 at remote station 3, which is effective in a manner to be explained hereinafter when the call-in buttons at that station are in their normal positions as shown. Each remote station has a call indicator lamp associated with the associated push-button at each master station. Thus, when remote station 3 operates the call in push-button 16, the lamp 18 will be included in a circuit extending in series through all the push-buttons 7, 8, 9 and 10 in their normal unoperated positions to the call in bus 19 leading to the winding of the talk-listen relay 20 to battery whereby the indicator lamp 18 will glow and the relay 20 will operate to close the operating circuit for the chime 21 whereby the operator at master station 1 is given a common audible signal and an individual visual signal. The operator will respond by operating the push-button 7 whereupon a talking connection will be established between his speaker 22 and the speaker 23 at remote station 3. The original circuit for calling indicator 18 will be replaced by a direct connection to battery and the circuit for the winding of relay 20 will be opened.

Each remote station is provided with a privacy button by which the subscriber thereat may apply a short-circuiting ground to the operation relay at the master station which has operated its selector button to establish the connection. By preventing the operation of the master station operate relay, the speaker thereat is switched from effective connection to the master station outgoing terminals to the master station call in terminals and thus it is necessary for the operator at the master station to depress his talk-listen switch to free his operate relay and to allow the simultaneous operation thereof and his talk-listen relay to establish a one-way talking connection in which he may talk but in which the remote station may not talk. While this connection is being effectively used, should another master station attempt (master station 2 operates push-button 12) to establish a connection to remote station 3, the operate relay in master station 2 will not operate and a privacy busy lamp will glow to indicate that the operator at master station 2 is intruding on a busy station.

Should a connection be established from a master station (from its call out terminals) through a selector push-button to another master station (through its call-in terminals) this called master station may establish a privacy condition (in case it is involved in some other conversation) by operating its privacy button to open the connection between its speaker and its call-in terminals. Since its operate relay will be in operation, a ground applied by the calling master station to the mid tap of its talking circuit will be transmitted through a contact of this operate relay (at the called busy master station) and will be extended to the indicator lamp 24 to notify the operator thereat that another master station operator is attempting to establish a connection. The operator at master station 1 approaching the master station 2 through push-button 10 cannot override the privacy condition established at master station 2.

If the master station 1 is in conversation with a remote station (say station 3) and master station 2 attempts to establish a connection with either, with station 3 by operating button 12 or with master station 1 by operating button 13, it will pick up a ground when it connects across the audio circuit between the two stations. If the attempted connection is to the remote station, this ground will come from the mid tap of the audio transformer but if the attempted connection is to the other master, this ground will come from the push-button by which master 2 attempts to reach busy master 1. In this latter case the ground supplied over the third set of contacts of the push-button used at master 2 to try to reach master 1 will be extended within master 1 by the operated operate relay therein to the mid tap of the resistance network bridged to the call in conductors of master 1 thence to the call out conductors of master 2 and the mid tap of the talking circuit transformer of master 2 to prevent the operation of the operate relay of master 2. Thus master 2 actually provides the ground to bar the operation of its own operate relay. In either case this ground will be applied to the operate relay of the calling master station to shortcircuit it and prevent its operation at the same time causing its busy lamp to glow. Thus it is impossible for one master to break in upon an existing connection since its operation relay will always be shortcircuited through the push-button contacts between the calling master and the busy station.

Whenever one master station selects another master, a ground circuit is applied to the annunciator circuit of the called station thereby operating the annunciator lamp at the called master station. This annunciator circuit is in series with the coil of the talk-listen relay, thereby operating this relay. Upon this relay being operated, battery is applied across the chime circuit to provide an audible call signal to indicate that someone has called into the master station. The call in circuits of remote stations ground this common annunciator bus and also energize their respective indicator lamps. When one master selects another master, ground is applied to this annunciator circuit through the annunciator lamp and a circuit over the third wire of the call-in terminals of the called master applied thereto by the push-button selector at the calling master station. It will be more fully explained hereinafter that the chime is in a circuit substantially open but in series with a large capacity condenser whose charging current will operate the chime. However, when this condenser is fully charged during the continued operation of the talk-listen relay, the current through the chime is very small and thus the chime is operated only upon the initial operation of the talk-listen relay. The chime circuit is opened by the talk-listen bar but is held closed through a high resistance from battery supplied through a selector push-button to maintain the said condenser charged during the conversational period.

Figure 2:
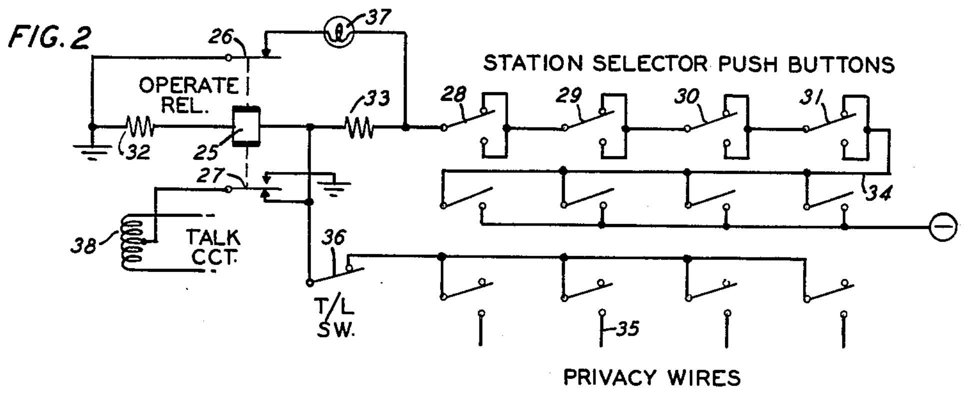
FIG. 2 is a fragmentary schematic circuit diagram to show the manner in which the operate relay may be normally operated and how it may be barred from operation by the encounter with a busy or a privacy condition.

FIG. 2 is a fragmentary schematic circuit diagram showing the manner of operation of the operate relay. Here this relay is shown by its winding 25 and two of its armatures 26 and 27. Four push-buttons 28, 29, 30 and 31 are indicated so it will be seen that under normal conditions the circuit for the operate relay extends from ground, a resistor 32, the winding 25 of the operate relay, a resistor 33 and thence in series through contacts of the buttons 28, 29, 30 and 31 to a bus 34 which, through other contacts of these push-buttons, may be extended to a source of current when any one of the buttons is depressed but which leaves an open circuit when no one of the buttons is operated. It is to be particularly noted that each of the contacts 28 and so on extends this connection in both its normal and its operated position but will open the connection during its travel from one to the other of these positions. If no one of the privacy wires is grounded, then the operate relay will respond to the operation of any one of the push-buttons. However, if it may be assumed that privacy wire 35 is grounded and button 29 is then operated, the ground on wire 35 will be extended through the talk-listen switch 36 to shortcircuit the winding 25 so that after the series circuit through button 29 is completed upon the full operation thereof the operate relay will fail to operate and the battery current will flow through the privacy busy lamp 37 and the closed contact 26 of the relay. Under these conditions the operator may override the privacy condition by operating the talk-listen switch 36 thus removing the privacy ground from the winding of the operate relay 25 allowing it to operate. However, when he releases the talk-listen switch, the winding of the operate relay 25 will again become shortcircuited and it will again release.

When the operate relay 25 is operated a ground is transmitted through the armature 27 to the mid point of the transformer winding 38 so that if another master makes connection to the same station to which the master of FIG. 2 is connected, this ground will be transmitted through the parallel connection of the two talk circuits through the unoperated armature 27 of this other master to short circuit the winding 25 and thus bar the operation of the intruding master. This bar cannot be overridden and hence the lamp 37 of this intruding master will glow to give a busy indication.

Figure 3:
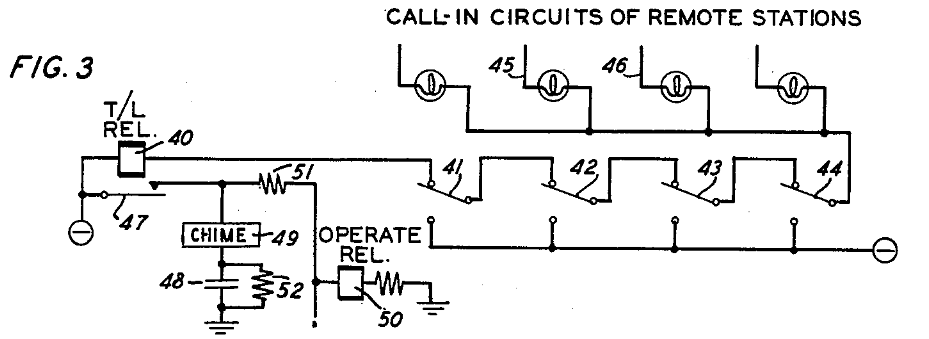
FIG. 3 is a fragmentary schematic circuit diagram showing the operation of the chime circuit.

FIG. 3 is a fragmentary schematic circuit diagram to show the chime circuit. The talk-listen relay coil 40 is connected into a series circuit extending through armatures 41, 42, 43 and 44 of the various push-buttons, all of which are released to their non-operated positions. When some remote station grounds its call in wire, say wire 45, the indicator 46 will glow and at the same time cause the operation of the talk-listen relay 40. Relay 40 will close its armature 47 and thus complete a charging circuit for the condenser 48 through the chime 49 which will respond to this charging current and thus give a single audible signal. As long as the relay 40 remains operated, the current flow through the chime will remain at a very low level insufficient to further operate the chime 49. During some short periods when the talk-listen relay 40 becomes released, the battery potential connected to the operate relay 50, limited by the resistor 51 will be sufficient to maintain the condenser 48 in a charged state. When both sources of battery connected to the chime are cut off at the end of a conversation, then the resistor 52 will discharge the condenser 48 to prepare it for another chime operation.

Figure 4:
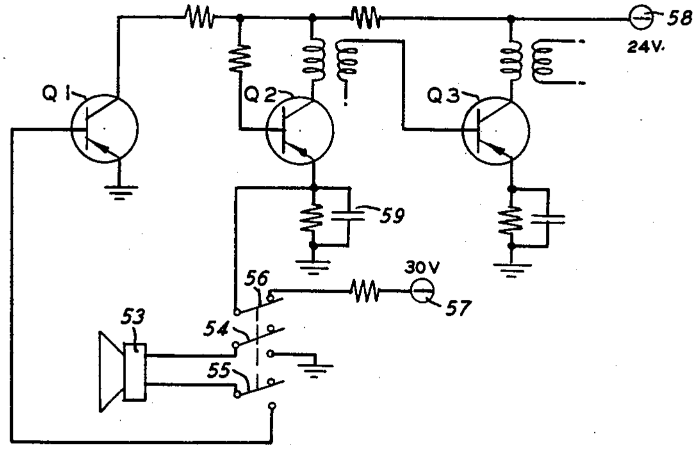
FIG. 4 is a fragmentary schematic circuit diagram showing the means employed to provide noiseless switching of the master station speaker into and out of circuit.

FIG. 4 is another fragmentary schematic circuit diagram showing the essential elements of the means employed for muting the speaker. Here the speaker is shown disconnected from the remainder of the circuit by the armatures 54 and 55 of the operate relay. At the same time the armature 56 maintains a connection from a negative potential source 57, which is more negative than the source 58, to the emitter of the transistor Q2. This negative battery from source 57 charges the condenser 59 so that upon the operation of the operate relay the rise of potential on the emitter of Q2 is gradual, thus preventing the sudden connection of the speaker 53 between ground and the talking circuit through the amplifier from being manifested as a noise or a click. It is known that these transistor amplifiers tend to go into oscillation when disconnected from their load so that the complete disablement of the driver Q2 while the amplifier is not in use provides for quiet operation particularly as the speaker is switched into and out of use by the operate relay.

Figure 5:
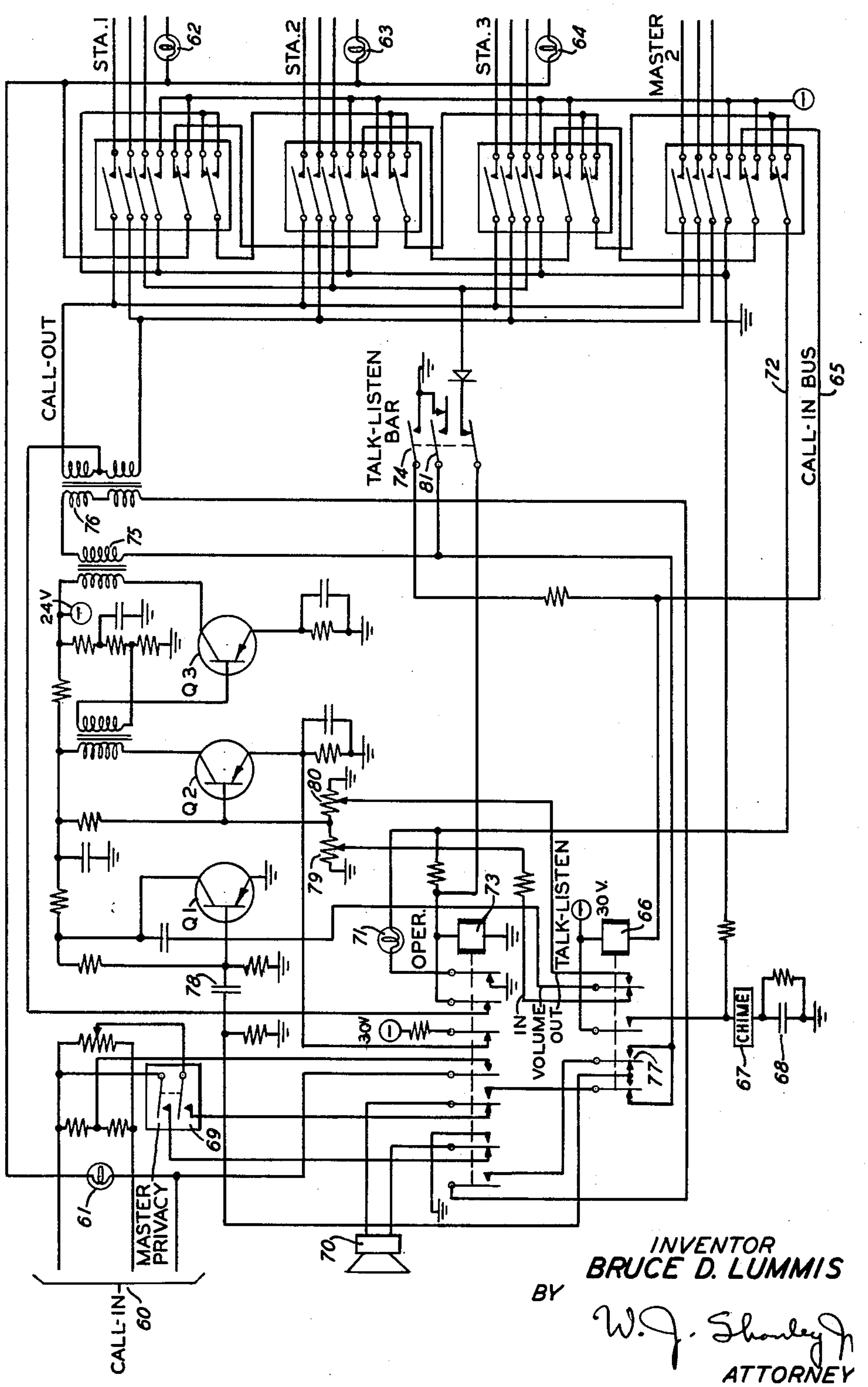
FIG. 5 is a schematic circuit diagram of the master station embodying the features also shown and described in the foregoing FIGURES 2, 3 and 4.

FIG. 5, which embodies the features hereinabove described in connection with FIGS. 2, 3 and 4, is shown in some detail. Certain values of the various components are noted in this figure and it will be understood that these values are given by way of example and that such values may be changed over wide ranges without departing from the spirit of the invention. The master station consists of an apparatus unit associated with an array of push-buttons one for each remote station or other master station accessible thereto. A call in indicator for each remote station is associated with the push-button by which such remote station may be reached. Where another master station calls in to the master station herein shown, the approach will be made directly to the call in terminals 60 so that it is unnecessary for the operator herein to identify and operate a push-button for the purpose of responding to the incoming call. Nevertheless a call indicator 61 is provided and this as well as the other remote station call indicators 62, 63 and 64 will extend a ground to the call in bus 65 to operate the talk-listen relay 66 which will extend a battery connection to the chime 67. The application of battery to this chime will produce a charging current in the condenser 68 and the chime will sound a single stroke. Thus the operator at this master station will have his attention called to the fact that he is being called. This station is provided with a switch known as the talk-listen bar which the operator may press to place his apparatus in a talking condition, but this is not used when the station is being called over its call in terminals 60. In this case the talk-listen relay 66 alone is operated under control of the other master station which has made the call. In this case also, the operator responds by operating his master privacy button 69 which thereupon connects his speaker 70 to the talking circuit over the call in terminals 60.

Where the master station is used to establish a call to a remote station, the operator presses the appropriate push-button and then, if the privacy and busy lamp 71 does not indicate that he is intruding on a busy remote station or one in privacy, he will operate his talk-listen bar to put his station in talking position.

As soon as one of the push-buttons has been depressed, battery will be extended therethrough to the series circuit terminating in conductor 72 whereby the operate relay 73 will become operated and will remain operated thereafter except under a special condition when another push-button is operated, as explained hereinbefore in the description of FIG. 2. During the use of the circuit after a single push-button has been operated, the operate relay will remain operated but the talk-listen relay 66 will respond to the talk-listen bar as operated by the master station operator.

In the listen position where the contact 74 is open as shown, there is no circuit for the talk-listen relay 66 and this relay remains in its non-operated position as shown. Since the operate relay 73 is energized, the speaker 70 is connected to the secondary (right hand winding) of the transformer 75. The incoming signal is passed by the secondary (left hand winding) of transformer 76, through closed contacts of the operate relay 73, an armature 77 and back contact of the talk-listen relay 66, through a condenser 78 to the base of the first transistor Q1. Since the talk-listen relay 66 is not operated, the base of the driver Q2 is controlled by the potentiometer 79 and hence an appropriately adjusted voice current will be delivered by the base collector circuit of the last stage transistor to the primary of transformer 75 and thus to the speaker 70, as explained.

When the master station operator wishes to talk, he presses his talk-listen bar and causes the operation of the talk-listen relay 66. The speaker will now be switched directly to the base of transistor Q1 and the volume control for the driver Q2 will be transferred to potentiometer 80. The secondary of transformer 75 will be connected to the secondary of transformer 76 so that speech will be transmitted from the speaker 70 over the transistor amplifier and out over the call out circuit.

It may be noted that a passing contact to ground is made during the operation of the talk-listen bar by its switch 81 for the purpose of quieting the talking circuit and preventing switching noises.

Other features of the operation of this circuit, it is believed, will be readily apparent.

What is claimed is:

1. A loudspeaking intercom system comprising a remote station; first and second master stations; first and second interstation circuits for respectively connecting said first and second master stations with said remote station; privacy switch means located at said remote station; each of said master stations including amplifying means, means for preparing, when placed in an operative condition, a connection between said amplifying means and the corresponding interstation circuit and means for completing said prepared connection in response to the application thereto of an energizing potential, a source of energizing potential, means for connecting said source to said connection completion means in response to said preparing means assuming said operative condition and means including said interstation circuits for shorting said source when said privacy switch means assumes its operative condition whereby the completion of said prepared circuit is under the control of the operative condition of said privacy switch means.

2. The combination of claim 1 in which said means for completing said prepared connection is also responsive to the connection thereto of said source of energizing potential for preparing a shorting circuit for the source of energizing potential of the master station which latter has its preparing means placed in an operative condition to thereby provide busy lockout of the second master station to be connected to said remote station.

3. The combination of claim 2 in which said preparing means comprises a master station intercom circuit and selector switch means for selectively connecting said master station intercom circuit to the interstation circuit.

4. The combination of claim 3 in which said connection completing means comprises means for connecting said intercom circuit to said amplifying means in response to the application thereto of said energizing potential, said interstation circuits comprising a control circuit and interstation intercom circuits, and said means for shorting said source comprises said control circuit and said privacy switch and means for connecting said control circuit and privacy switch so as to complete a shorting connection in parallel with said source upon said privacy switch assuming its operative condition.

5. A communication system in which an intercom circuit may be established by push-button operation at a master station between a bidirectional transducer thereat and a bidirectional transducer at a remote station, comprising a transistor amplifier for insertion in said intercom circuit, an enabling relay at said master station responsive to said push-button operation, said relay having means for inserting said amplifier in said talking circuit and means for enabling said amplifier, said means for enabling said amplifier consisting of means to hold said amplifier in a non operative condition and means for bringing said amplifier upon the said operation of said relay slowly into operation, the said slowness of said operation being controlled by a transient current initiated by the operation of said relay.

6. A communication system in which an intercom circuit may be established by push-button operation at a master station between a bidirectional transducer thereat and a bidirectional transducer at a remote station, comprising a transistor amplifier for insertion in said intercom circuit, an enabling relay at said master station responsive to said push-button operation, said relay having means for inserting said amplifier in said talking circuit and means for enabling said amplifier, means for normally applying to said amplifier an inhibiting potential, said amplifier having a condenser connected thereto also responsive to said inhibiting potential, said means for enabling said amplifier consisting of means for breaking the connection of said inhibiting potential to said condenser and said amplifier to retard the enablement of said amplifier by the discharge time of said condenser.

7. A communication system in which an intercom circuit may be established by push-button operation at a master station between a bidirectional transducer thereat and a bidirectional transducer at a remote station, comprising a transistor amplifier immediately ready upon enablement for insertion in said talking circuit, an enabling relay at said master station responsive to said push-button operation, said relay having means for inserting said amplifier in said intercom circuit and means for enabling said amplifier, means for normally applying to said amplifier an inhibiting potential, said amplifier having a condenser bridged by a discharge connection thereto and normally charged by said inhibiting potential, said means for enabling said amplifier consisting of means for breaking the connection of said inhibiting potential to said condenser and said amplifier, to retard the enablement of said amplifier by the discharge time of said condenser, whereby the complete enablement of said amplifier is retarded during the period of said push-button operation.

References Cited in the file of this patent

UNITED STATES PATENTS

| | | |
|---|---|---|
| 2,245,756 | Cavanaugh et al. | June 17, 1941 |
| 2,529,912 | Campbell | Nov. 14, 1950 |